United States Patent [19]

Kuhrt et al.

[11] 3,929,682

[45] Dec. 30, 1975

[54] CATALYST FOR DECOMPOSING HYDRAZINE AND ITS DERIVATIVES AND PROCESS OF MAKING SAME

[75] Inventors: Winfried Kuhrt, Hannover; Helmut Derleth, Nienburg; Hermann Fischer, Evern, all of Germany

[73] Assignee: Kali-Chemie Aktiengesellschaft, Hannover, Germany

[22] Filed: Aug. 14, 1974

[21] Appl. No.: 497,251

[30] Foreign Application Priority Data
Aug. 16, 1973 Germany............................ 2341363

[52] U.S. Cl............................ 252/466 PT; 423/407
[51] Int. Cl.²...................... B01J 21/04; B01J 23/56
[58] Field of Search................ 252/466 PT; 423/407

[56] References Cited
FOREIGN PATENTS OR APPLICATIONS
1,108,192   6/1961   Germany....................... 252/466 PT
1,544,770   9/1968   France.......................... 252/466 PT Primary Examiner—W. J. Shine
Attorney, Agent, or Firm—Bacon & Thomas

[57]         ABSTRACT

A catalyst for decomposing hydrazine and its derivatives is obtained by repeatedly impregnating active aluminum oxide with an iridium salt solution which may contain an osmium salt whereby after each impregnation step the impregnated aluminum oxide is dried, preferably in an inert gas atmosphere. The impregnated and dried aluminum oxide is reduced in a current of hydrogen at least after each second drying step. Impregnation, drying, and reduction are effected at least four times. The resulting catalyst has a high stability and abrasion resistance.

19 Claims, No Drawings

CATALYST FOR DECOMPOSING HYDRAZINE AND ITS DERIVATIVES AND PROCESS OF MAKING SAME

BACKGROUND OF THE INVENTION

1. Field of the Invention

The present invention relates to a novel and improved catalyst and more particularly to a platinum metal catalyst useful for spontaneously decomposing hydrazine and its derivatives and to a process of making such a catalyst.

2. Description of the Prior Art

Satellites and probes for space exploration require additional propulsion systems for controlling and changing their course and their position. Such propulsion systems must be of a high functional reliability and of a rather simple design. While systems which control the path or course of satellites or probes, i.e. systems as they are required, for instance, to control deviations in inclination, are often able to operate under stationary conditions, there are required, for instance, for drift control and drift correction of spin-stabilized satellites, propulsion systems permitting impulses to succeed each other with a time interval of a few milliseconds and guaranteeing a high accuracy in impulse recurrences independently from environmental conditions.

Propulsive units which make use of the catalytic decomposition of monopropellants have proved to be especially suitable for such a purpose. As monopropellants there are designated those liquid homogeneous propellants which decompose in the presence of a catalyst without the addition of another reactant, thereby spontaneously generating or producing the propelling gas. Liquid hydrazine which decomposes in contact with metal-containing catalysts into hydrogen, nitrogen, and ammonia, is used as preferred monopropellant. Derivatives of hydrazine, for instance, 1,1-dimethyl hydrazine react in an analogous manner.

The requirements which a catalyst for the decomposition of a monopropellant in path and position controlling propulsive units must meet can briefly be summarized as follows:

a. Minimum dead or delayed reaction time.
b. As short as possible a time period required for generating the required pressure in the reaction chamber.
c. Minimum pressure variations in the chamber during decomposition of the monopropellant.
d. Rapidly decreasing pressure in the reaction chamber after cutting off the propellant supply.
e. Minimum influence of the temperature upon the decomposition reaction when taking place above room temperature.
f. As low as possible an abrasion of the catalyst which is supplied in the form of pellets or small particles.
g. Maximum pressure in the reaction chamber by a definite feed rate of the monopropellant as well as a loading capacity of the catalyst bed as high as possible.
h. Prolonged working life and resistance to aging of the catalyst.
i. Optimum reproducibility of all values.

Numerous catalysts of different composition and manufactured by different processes have been suggested for the decomposition of hydrazine and its derivatives. The so-called Raney catalysts represent one of the groups of such catalysts. They have, however, the disadvantage that they require a rather long period of time for initiating decomposition under cold conditions, i.e. they attain their maximum operational efficiency only after an unduly prolonged period of time.

Furthermore, hydrazine decomposition catalysts have been suggested which are produced by coating a basic structure such as asbestos, glass fiber web, or metal fibers with oxides or mixtures of oxides. For instance, German Published Applications No. 1,916,247 and No. 2,036,958 disclose as active components of such catalysts mixtures of the oxides of copper, cobalt, and thorium; of copper, cobalt, and cerium; or, respectively, of iron, manganese, and the alkaline earth metals. But such catalysts with all their properties combined also do not meet the severe requirements of controlling and adjusting the path or course and position of satellites or probes. Thus, they cannot be used for this purpose.

In German Pat. No. 1,108,192 there is described the use of an iridium-containing catalyst. This catalyst is obtained by absorption of an iridium compound upon a carrier and by subsequently reducing the iridium compound to iridium metal. Hydrazine decomposition on said catalyst, however, takes place only very slowly. To decompose only small amounts of hydrazine requires a reaction time of several minutes.

German Pat. No. 1,792,570 describes a method for producing hydrazine decomposition catalysts which contain between 25 and 45 %, by weight, of metallic iridium. Such catalysts are obtained by mixing aluminum oxide, in the form of a colloidal powder which can be rehydrated, with hexachloro iridic acid, also in powder form. The mixture is hydrated by means of water, dried, calcined, and ground. Thereafter the iridic acid compound is reduced to metallic iridium by the action of an aqueous alkali metal boranate solution. After drying the moist catalyst it is activated by heating in a hydrogen current for several hours.

The resulting catalyst exhibits a satisfactory activity and requires a short initiating period for decomposing liquid hydrazine. However, not only appreciable abrasion but also a considerable decrease in volume of the abraded catalyst take place with increased reaction duration. Another disadvantage of said catalyst is that it requires grinding or comminution for its manufacture. It is well known that, when grinding a solid material, there is always obtained a ground product with particles of considerably varied grain sizes. However a catalyst to be used in propulsive units of satellite rockets and probes should have a uniform form, for instance, rounded off granules of a grain size of 14–18 mesh according to ASTM-E-11-61, corresponding to a grain diameter of between 1.0 and 1.4 mm., or of a grain size of 20–30 mesh corresponding to a grain diameter between 0.6 and 0.84 mm. Thus, when producing a catalyst according to the above mentioned process, considerable losses in yield must be accepted due to the formation of granular material of a lower than the desired particle size. As a result thereof it is necessary to recover the expensive noble metal from such a material of undersized particles and to convert subsequently the noble metal into its originally used noble metal compound.

In said German Pat. No. 1,792,570 there is referred generally, as state of the art, an iridium catalyst which is produced by impregnating aluminium oxide with an iridium salt solution, subsequently reducing the iridium with a solution of alkali metal boranate, repeating the impregnation and reduction steps several times drying the catalyst and activating the catalyst by heating it in a stream of hydrogen. The disadvantage of such a catalyst, is that a layer of the inert carrier is deposited thereon by erosion, thus causing a decrease in activity of the catalyst. Moreover alkali metal boranate is an expensive reducing agent, generating alkali metal ions, which are a catalyst poison and therefore must be removed from the catalyst very carefully.

SUMMARY OF THE INVENTION

It is one object of the present invention to provide a process for producing with a high yield a catalyst useful for decomposing hydrazine and its derivatives in propulsion units which catalyst meets all the above mentioned requirements.

Another object of the present invention is to provide such a novel and improved catalyst.

Still another object of the present invention is to use the novel and improved catalyst according to the present invention for the decomposition of hydrazine and its derivatives in propulsion units.

Other objects and advantageous features of the present invention will become apparent as the description proceeds.

According to the present invention these objects are achieved by applying to and coating preformed particles of activated aluminum oxide with iridium or a mixture of iridium and osmium in which mixture the osmium is present in an amount up to 60% by weight of the total amount of platinum metals, and at least four times repeating the following coating process steps:

1. Impregnating the preformed aluminum oxide particles with an aqueous solution of the platinum metal compound or the two platinum metal compounds;
2. drying the moistened material between 100° C. and 300° C., preferably in an inert gas atmosphere; and
3. reducing the platinum metal compound or compounds to the respective platinum metal by exposing the coated aluminum oxide particles to a hydrogen current between 180°and 300° C. The thus prepared catalyst contains between 20 and 40%, by weight, of the platinum metal or metals.

For producing a catalyst which contains solely iridium, a concentrated solution of an iridium compound is subdivided into several portions with which the activated aluminum oxide particles are then impregnated. In order to prepare a catalyst which contains osmium in addition to iridium, there is either applied a concentrated solution containing compounds of both metals in the manner as described hereinabove, or the aluminum oxide particles are alternatively impregnated with solutions containing, respectively, only the iridium compound or only the osmium compound. The impregnated aluminum oxide particles are dried after each impregnation step. Usually it is sufficient to repeat such impregnation 4 to 10 times. When the impregnation is carried out with two different solutions containing either iridium or osmium it is sufficient to repeat the impregnation with each solution 4 or 5 times so that totally 9–11 impregnation steps are carried out.

It has furthermore been found that it is not necessary to carry out the reduction step after each impregnation step. It is also sufficient to carry out reduction after each second impregnation and drying step, i.e. after having applied the iridium containing solution twice or after having applied the iridium solution and subsequently the osmium solution. It is evident that this procedure is the preferred one because thereby each second reduction step is eliminated.

It has been found that when proceeding according to the present invention and repeating several times the impregnation, drying, and reduction steps under the conditions disclosed and claimed herein, there are produced catalysts which do not only fully meet all the above mentioned requirements with respect to their catalytic properties, but which are also especially stable in mechanical respects, i.e., which show negligible abrasion even after prolonged use in propulsion units while retaining their full activity. In contrast thereto, catalysts which are prepared by repeated impregnation but whereby the reduction to the metal is effected only after each third or fourth impregnation or even only once at the end of the manufacturing process, are rather unstable and the active components with which the carrier is coated tend to peel off.

The good catalytic activity of the catalyst may be attributed to the impregnation procedure using concentrated acid noble metal solutions. Another important factor for the good catalytic activity is the reduction in a hydrogen stream at the temperatures defined.

Granulated or pelletized particles of active aluminum oxide are preferred carrier materials to be used in the process according to the present invention. Any type of amorphous or crystalline hydrated aluminum oxide can be used for the manufacture of such particles. Preferably the particles are heated to 500°–1000°C before their use in such a manner that their specific surface, determined according to the BET-method, amounts to 60 to 220 sq.m. per gram. The BET-method is described in J. Am. Chem. Soc. 60 (1938) 309.

The impregnation solutions should be as concentrated as possible. Their metal content should be at least 0.5 Mol/l and preferably between 0.6 and 1.2 Mol/l calculated as the sum of the noble metals present. Preferably iridium and osmium are used in the form of their chlorides in predominantly tetravalent state. To improve their solubility hydrochloric acid is added to the solution so that it has a $p_H$ value of between 0.1 and 1.5. The preferred $p_H$ range of the impregnation solution lies between 0.5 and 1.2. It is deemed that the acidity of the impregnation solution has a favourable effect on the activity and mechanical strength of the finished catalyst.

It has proved to be of advantage to carry out the impregnation of said particles of active aluminum oxide by applying thereto, under continuous stirring, drop by drop, the concentrated solutions in an amount, that the solution is quantitatively absorbed by the carrier material.

The high concentration of noble metal in said impregnation solution has the advantage that the carrier can absorb quantitatively the required amount of liquid at each impregnating step, i.e., that the carrier after impregnation is still flowable, does not adhere to the walls of the impregnating vessel, and no separation of the impregnated carrier from supernatant liquid is necessary.

Drying of the impregnated carrier is preferably effected in an inert gas atmosphere, for instance, in nitrogen or in noble gases. A drying temperature between 100° and 300°C and preferably between 200° and 250°C and a drying time of 2 hours to 4 hours have proved to yield optimum catalysts.

Reduction of the metal compound to the metal which is carried out after each drying step or after each second drying step, is preferably effected by means of molecular hydrogen which is free of oxygen and moisture. The hydrogen is passed through the impregnated and dried carrier at elevated temperature. It has been found that the reduction temperature considerably affects the activity of the catalyst. Especially active catalysts are obtained by carrying out the reduction at temperatures between 180° and 400°C and preferably between 220° and 280°C. The catalyst can be used immediately following the last reduction step without any further activating aftertreatment. It has a specific surface area of 40 to 170 sq.m. per gram (determined according to the BET-method) depending upon the specific surface area of the carrier material used and a pore volume of 0.10 to 0.15 cm³/g; 50 to 70% of the pores having a diameter of less than 500 A.

DESCRIPTION OF THE PREFERRED EMBODIMENTS

The following examples serve to illustrate the present invention without, however, limiting the same thereto.

EXAMPLE 1

10.5 g of activated aluminum oxide of a grain size of 20–30 mesh and a specific surface area of 135 sq.m./g. and 37 ml. of a strongly acid hydrochloric acid solution of iridium tetrachloride containing 146 mg/ml. (0.76 mol/l) of iridium and having a $p_H$ value of 0.8 are used for preparing a catalyst according to the present invention. The iridium tetrachloride solution is subdivided into 7 equal portions by volume. The granulated aluminum oxide is impregnated by applying thereto drop by drop one portion of said solution so that the carrier absorbs the total amount of the impregnation solution. The impregnated granulate is dried at 200°C in a nitrogen atmosphere for 2 hours. The dried impregnated carrier is treated at 250°–270°C in a current of hydrogen for 90 minutes. Impregnation, drying, and reduction are repeated six times. The resulting catalyst has an iridium content of 34%, a specific surface area of 103 sq.m./g.; the proportion of dust and subgrain, i.e. the proportion of particles with a grain diameter below 0.6 mm., amounts to 1.5 %. This is the contrast to the manufacture of the catalyst according to German Pat. No. 1,792,570, wherein a far greater proportion of fines are obtained from which the precious iridium must be recovered.

EXAMPLE 2

10 g. of an alumina granulate of a grain size of 20–30 mesh and a specific surface area of 180 sq.m./g. is impregnated drop by drop with 5 ml. of a strongly acid hydrochloric acid solution of iridium tetrachloride containing 128.7 mg./ml. (0.67 mol/l) of iridium and having a $p_H$ value of 1. The impregnated granulate is dried at 200°C in a nitrogen atmosphere for 2 hours. It is then again impregnated with 5 ml. of the aforesaid solution, dried under the same conditions, and subsequently exposed to the action of a current of oxygen- and moisture-free hydrogen at 250°C for 2 hours. These impregnating, drying, and reducing steps are repeated three times. The finished catalyst contains 34 % of iridium and has a specific surface area of 110 sq.m./g. The amount of particles of subgrain size is 2.7 %.

EXAMPLE 3

A catalyst which contains 17 % of iridium and 17 % of osmium is prepared as described in Example 2. For this purpose a hydrochloric acid solution having a $p_H$ value of 1 which contains 65 mg./ml. (0.34 mol/l) of osmium and 65 mg./ml. (0.34 mol/l) of iridium is used. The final product has a proportion of subgrain size material of 2 %.

EXAMPLE 4

30 mg. of a catalyst of the grain size of 20–30 mesh are covered with 0.5 ml of liquid anhydrous hydrazine in a narrow open vessel. Decomposition starts instantaneously and to its full extent with all the above described catalysts. No ignition lag can be observed visually. After complete decomposition of the hydrazine which requires about 20 seconds, the catalyst is three times reacted with the same amount of hydrazine, whereby the liquid is each time added only after the catalyst is completely dry. Thereafter, the proportion of catalyst which is still present in its initial grain size of 20–30 mesh is determined and the amount of abrasion is calculated from this figure. The following Table I shows the results achieved:

TABLE I

| Catalyst | Remaining amount of catalyst | Abrasion |
|---|---|---|
| Prepared according to Example 1 | 29.1 mg. | 3.0 % |
| Prepared according to Example 2 or 3 | 29.0 mg. | 3.5 % |
| Prepared according to Example 2, whereby reduction is carried out only after the fourth and the last impregnating step | 19.0 mg. | 37.0 % |
| Prepared according to Example 2, whereby reduction is carried out only after the last impregnating step | 10.0 mg. | 67.0% |
| Prepared according to the example in German Patent No. 1,792,570 | 18.0 mg. | 40.0 % |

These tests show that only the catalyst prepared according to the present invention possesses a high abrasion resistance. If reduction is not carried out at least after each second impregnation step, the abrasion resistance decreases to such an extent that the catalyst cannot be used for hydrazine decomposition in actual operation.

EXAMPLE 5

(These tests were carried out by the Deutsche Forschungs- und Versuchsanstalt fuer Luft- und Raumfahrt e.V., Institut fuer Chemische Raketenantriebe at Trauen (German Research and Experimental Institute for Aeronautics and Cosmonautics Registered Association, Institute for Chemical Rocket Propulsive Units at Trauen).

8 g each of the catalysts produced according to Examples 1 and 2 are investigated for their usefulness in a propulsive unit, the catalyst bed of which has a diameter of 17.8 mm. and a length of 25.4 mm. The investigations which were carried out under atmospheric conditions took place under stationary as well as under impulse jet drive conditions. The values given in Table II are determined with an average charge of propellant of 6 g. of hydrazine per second.

TABLE II

|  | Catalyst Example 1 | Catalyst Example 2 |
|---|---|---|
| Reaction delay time (reaction lag) |  |  |
| T = 20° C. | 14 msec. | 17 msec. |
| T = 200° C. | 4 msec. | 4 msec. |
| Time required for generating full pressure |  |  |
| cold | 240 msec. | 240 msec. |
| in pulse jet operation | 19 msec. | 19 msec. |
| Pressure fluctuations |  |  |
| in stationary operation | 2 % | 8 % |
| in pulse jet operation | 3 %. | 11 %. |

The catalyst according to Example 2 has endured 10,000 successive pulses of a single impulse duration of 0.7 seconds without any impairment of its quality.

What is claimed is:

1. A process for producing a catalyst for decomposing hydrazine and its derivatives, comprising the steps of impregnating particles of active aluminum oxide at least four times with an aqueous solution comprising a noble metal salt selected from the group consisting of an aqueous solution of an iridium salt, an aqueous solution of a mixture of an iridium salt and an osmium salt, and alternating aqueous solution of an iridium salt and an aqueous solution of an osmium salt, drying said impregnated product after each of said impregnation steps, and subjecting said dried product at least after each second drying step to reducing conditions in the presence of a stream of hydrogen gas at a temperature between about 180° and about 400°C, whereby said noble metal salt is reduced to the corresponding noble metal.

2. The process as defined by claim 1, wherein said impregnation solutions have a $p_H$ value between 0.1 and 1.5.

3. The process as defined by claim 1, wherein said impregnation solutions have a $p_H$ value between 0.5 and 1.2.

4. The process as defined by claim 1, wherein said impregnation step comprises impregnating said aluminum oxide with an aqueous solution of an iridium salt.

5. The process as defined by claim 1, wherein said impregnation step comprises impregnating said aluminum oxide with an aqueous solution containing an iridium salt and an osmium salt, the osmium being present in an amount of up to 60% by weight of the total metal content.

6. The process as defined by claim 1, wherein said impregnation step comprises alternately impregnating said aluminum oxide with an aqueous solution of an iridium salt and with an aqueous solution of an osmium salt.

7. The process as defined by claim 1, wherein the concentration of the noble metal in said aqueous solution is between 0.5 and 1.2 mol/l.

8. The process as defined by claim 1, wherein the concentration of noble metal salt in said aqueous solution is an amount sufficient to provide a noble metal content of between about 20 and about 40% by weight in the final catalyst.

9. The process as defined by claim 1, wherein said impregnation step is conducted between four and 10 times.

10. The process as defined by claim 1, wherein the active aluminum oxide has a specific surface area of about 60 to about 220 m.$^2$/g. determined according to the BET-method and wherein the finished catalyst has a specific surface area between about 40 and about 170 m.$^2$/g.

11. The process as defined by claim 1, wherein said impregnated aluminum oxide is dried at a temperature between about 100° and about 300°C.

12. The process as defined by claim 9, wherein said impregnated aluminum oxide is dried at a temperature between about 200° and about 250°C.

13. The process as defined by claim 1, wherein said impregnated aluminum oxide is dried in an inert gas atmosphere.

14. The process as defined by claim 1, wherein said reduction in a stream of hydrogen is carried out at a temperature between about 220° and about 280°C.

15. The process as defined by claim 1, wherein said reduction in a stream of hydrogen is carried out after each second impregnation and drying step.

16. The process as defined by claim 1, wherein said reduction in a stream of hydrogen is carried out after each impregnation and drying step.

17. The catalyst for the decomposition of hydrazine and its derivatives, comprising an active aluminum oxide carrier and from about 20 and about 40% by weight of a noble metal selected from the group of iridium, osmium and a mixture thereof being intimately dispersed throughout said carrier, having a specific surface area of 40–170 m$^2$/g, said catalyst having been prepared by the method as defined by claim 1.

18. The catalyst as defined by claim 17, wherein the particle size of said active aluminum oxide is between about 14 and 30 mesh.

19. The catalyst as defined by claim 17 having a pore volume of 0.10 to 0.15 cm$^3$/g and 50 to 70% of the pores having a diameter of less than 500 A.

* * * * *